Jan. 7, 1958
D. F. ALDRICH ET AL
2,819,371
HEATING APPARATUS
Filed Jan. 19, 1954
2 Sheets-Sheet 1
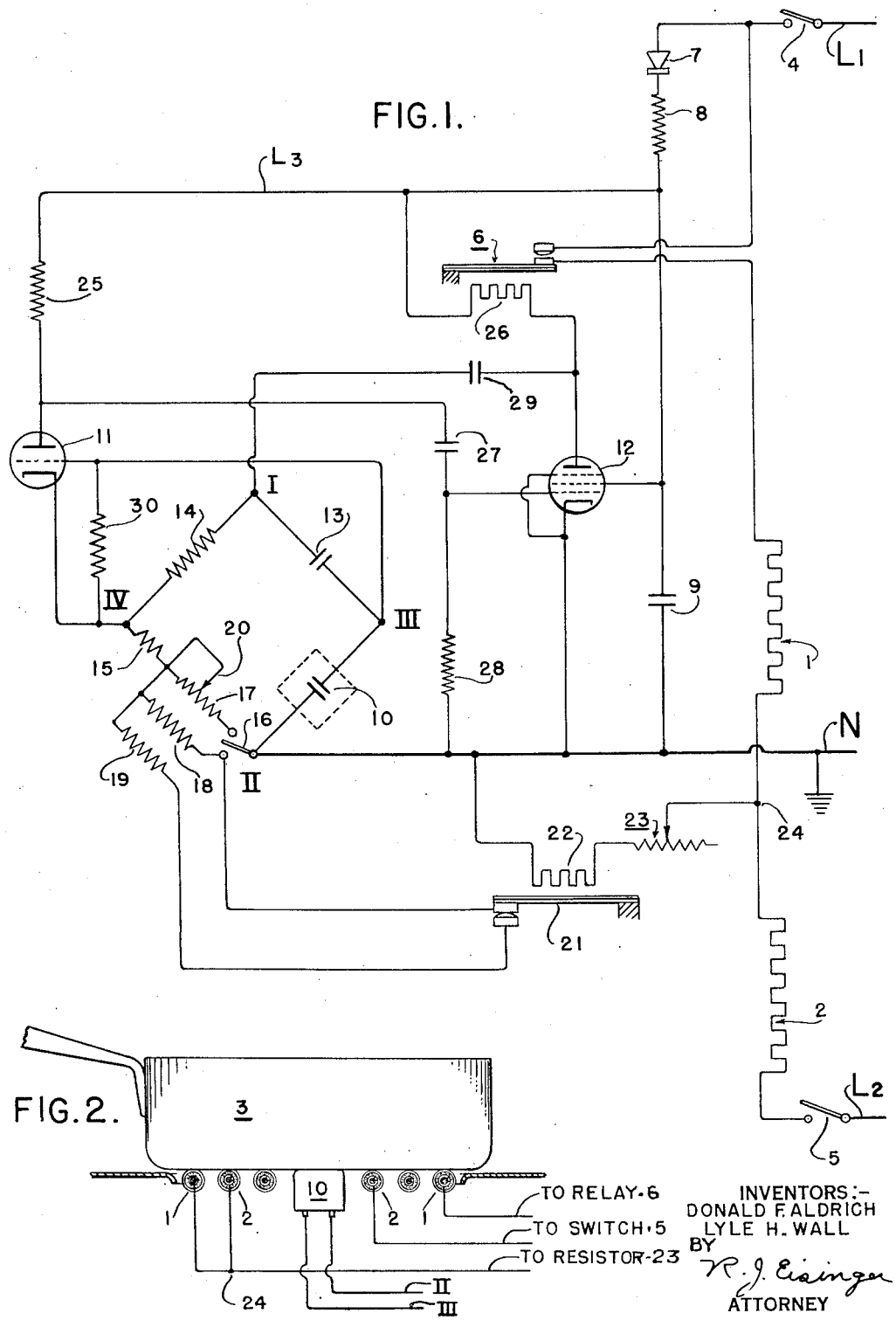
INVENTORS:-
DONALD F. ALDRICH
LYLE H. WALL
BY
R. J. Eisinger
ATTORNEY Jan. 7, 1958　　D. F. ALDRICH ET AL　　2,819,371
HEATING APPARATUS
Filed Jan. 19, 1954　　2 Sheets-Sheet 2

INVENTORS:-
DONALD F. ALDRICH
LYLE H. WALL
BY R. J. Eisinger
ATTORNEY

United States Patent Office 2,819,371
Patented Jan. 7, 1958

2,819,371

HEATING APPARATUS

Donald F. Aldrich, Elmira, N. Y., and Lyle H. Wall, Good Land, Kans., assignors to Westinghouse Electric Corporation, East Pittsburgh, Pa., a corporation of Pennsylvania Application January 19, 1954, Serial No. 404,923

15 Claims. (Cl. 219—20)

Our invention relates to an improved control for a heating device, particularly an electric heating device for cooking or similar service where it may be desired to preselect the temperature to which the charge is to be heated, or, in case the charge is a liquid, it may be desired to preselect the rate at which the boiling of the liquid will proceed. For example, in using an electric range, the housewife may at times wish to subject one food to a slow boiling at 212° F., the boiling point of water, and at other times may wish to fry another food at a temperature far above the boiling point of water. Our arrangement makes it possible for the housewife to preset a control knob so that the food will be heated to any desired cooking temperature whether above or below 212° F. and also, when boiling is the thing she desires, to predetermine whether the boiling shall be carried on at a slow, a moderate or a rapid rate. In each setting, the full available power of the heating element is used to bring the temperature rapidly up to the value selected, the heat input is then controlled so as to maintain the selected temperature or the desired rate of boiling, and no overheating is permitted, regardless of any changes in the condition of the heated substance. If food containing water is left on a heater preset for boiling, not only is the heat input controlled to maintain the preset rate of boiling as long as water remains in the utensil, but if the water should all boil off, the control then functions to limit the resultant temperature rise to a nominal value.

Electric ranges of the types being marketed today are usually provided with a control knob by which the wattage input to the electric heating element may be regulated at will; but frequent adjustment of this knob by the housewife is required in cooking if the cooking is to be done promptly and yet the food not be burned or overheated. For example, if the control knob is set at the position which will produce, but not exceed, the desired final cooking temperature, the heating wattage will be so low that the food will heat up to that temperature very slowly. Hence, the control knob is usually first set to insure full wattage input, and the housewife must remember, at the right time, to reduce the setting on the control knob to the lower wattage actually desired for the cooking operation. Moreover, even greater attention is required in the rather numerous occasions when foods with a large water content are being cooked, since control knob settings which will heat the food rapidly to the boiling temperature will cause the water to boil over, if much of it is present in the cooking utensil, or will boil it all away and badly scorch the food if the water is present in small amount.

Our invention is an improvement upon that described in U. S. Patent No. 2,500,061, issued to Earl K. Clark on March 7, 1950, which also relates to a control for a heating or cooking device. Application Serial No. 332,234, filed January 21, 1953, by Clyde A. Booker and George W. Nagel, relates to modifications of the control herein disclosed and claimed.

One of the principal objects of our invention is to provide a control system which may be preset to any temperature above or below boiling, and which will cause rapid heating to such temperature, thereafter maintaining that temperature with a high degree of precision until shut down by the operator, and which may carry out a boiling operation at a rate preset by the operator at any value within a wide range of values. This we achieve by a control in which there is maintained in good thermal contact with the cooking utensil or vessel being heated a temperature-variable impedance element, such as a capacitor or a resistor, which conditions an electronic control network to shut off heater current at a critical or control temperature which is predetermined by the setting of a control knob for cooking operations other than boiling. Variations in the temperature-variable impedance element control an electron-tube amplifier to cut off or turn on heater current when the critical temperature is reached; and the value of this critical temperature is predetermined by the setting of certain balance resistors, which is fixed by the position of the control knob. By changing the control knob position, the value of this critical temperature at which the electronic circuit cuts off or turns on heater current, which is also termed the control temperature, is adjusted at will by the housewife.

As has already been pointed out, it is desirable in cooking foods containing water that the housewife be able to preset the control to boil at a selected rate, slow or fast, as she may desire. In our control, the rate of boiling is controlled by periodically switching the balance-resistor network so that it supplies energy at a high level, such as full wattage, to the heater for a certain fraction of the time, the energization level of the heater being reduced by turning it off for the rest of the time. If the total period of the on-off cycle is sufficiently short, the cooking results are sensibly the same as if the required average wattage had been supplied to the heater continuously.

One of the principal features of this invention resides in the means for effecting the periodic switching of the main heater. By alternately and automatically shifting the control temperature to a temperature slightly above and then to a temperature slightly below the boiling temperature when the control is set for boiling, power to the heater will be turned on and off periodically as long as the utensil stays at the boiling temperature. During the time that the control temperature is below boiling, power will not be supplied to the heater, since the utensil temperature is above the temperature for which the control is set; and when the control temperature is above boiling, power will be supplied to the heater, since the utensil temperature is below the control temperature.

With the control adjusted for boiling operation, the response or control temperature of the control is shifted periodically by a cycling switch, for example, by inserting an auxiliary resistor in the temperature controlling network for a certain fraction of the time. The fraction of each period of the cycling switch during which the auxiliary resistor is connected in circuit is adjusted so that the respective durations of the alternative operations, and hence the average wattage input to the heater, may be set by the housewife by turning a controller within the boiling range. As the controller is turned, the average power input and consequently the vigor of boiling is progressively increased until at the end of the range the full wattage of the heater is called for by connecting the auxiliary resistor in, or out of, the circuit 100 percent of the time.

With the control adjusted for boiling operation, if the temperature of the utensil is below the lower control temperature, as when starting a boiling operation, then power is supplied continuously to heat the utensil as rapidly as possible to nearly the boiling temperature, whereupon the intermittent supply of power begins. On the other hand, if the water in the utensil boils away and the temperature rises above the boiling temperature, power will be completely cut off when and as long as the temperature of the utensil is above the higher control temperature, thereby preventing any substantial increase above such temperature.

Another object is to provide a control for a heating unit, which control may be preset to any desired rate of boil, and which control will effect maximum wattage input while heating to the boiling temperature and which will then automatically reduce the wattage input to maintain the degree of boil for which it is preset; a more particular object being to provide such a control which will cut off all current to the heating unit in the event that the temperature rises materially above the boiling temperature.

Another object is to provide a control which achieves one or both of the objects set forth in the immediately preceding paragraph and which may be further preset to a desired temperature, and which will cause rapid heating to such temperature and thereafter control to maintain that temperature.

Another object is to provide a control wherein the same temperature sensing element is utilized to provide temperature regulation and also to provide rapid heating and protection against over temperature when the control is set for boiling operation.

Another object is to provide an electric range control capable of effecting one or more of the objects mentioned above which shall employ electronic controls for the heater current.

Still another object is to provide a simple impedance network containing in one branch or channel, a temperature variable element and in other channels elements which may be altered by progressive movement of a handle to balance variations in said temperature-variable element while such balance is substantially independent, over a wide range, of variations in the voltage supplied to input terminals of said network.

Another object of this invention is to provide a control circuit which is operative to accomplish the aforementioned objects and all manually variable components of which may be adjusted by a single manually adjustable control element.

Other objects of our invention will be evident to those skilled in the art upon reading the following description taken in connection with the drawings in which:

Fig. 1 is a schematic diagram of one embodiment of an electric heater control circuit embodying the principles of our invention;

Fig. 2 is a vertical section taken through a range surface heating unit having two similar heating sections adapted to be connected as shown in Fig. 1 and with a cooking vessel atop the heater.

Figure 3:
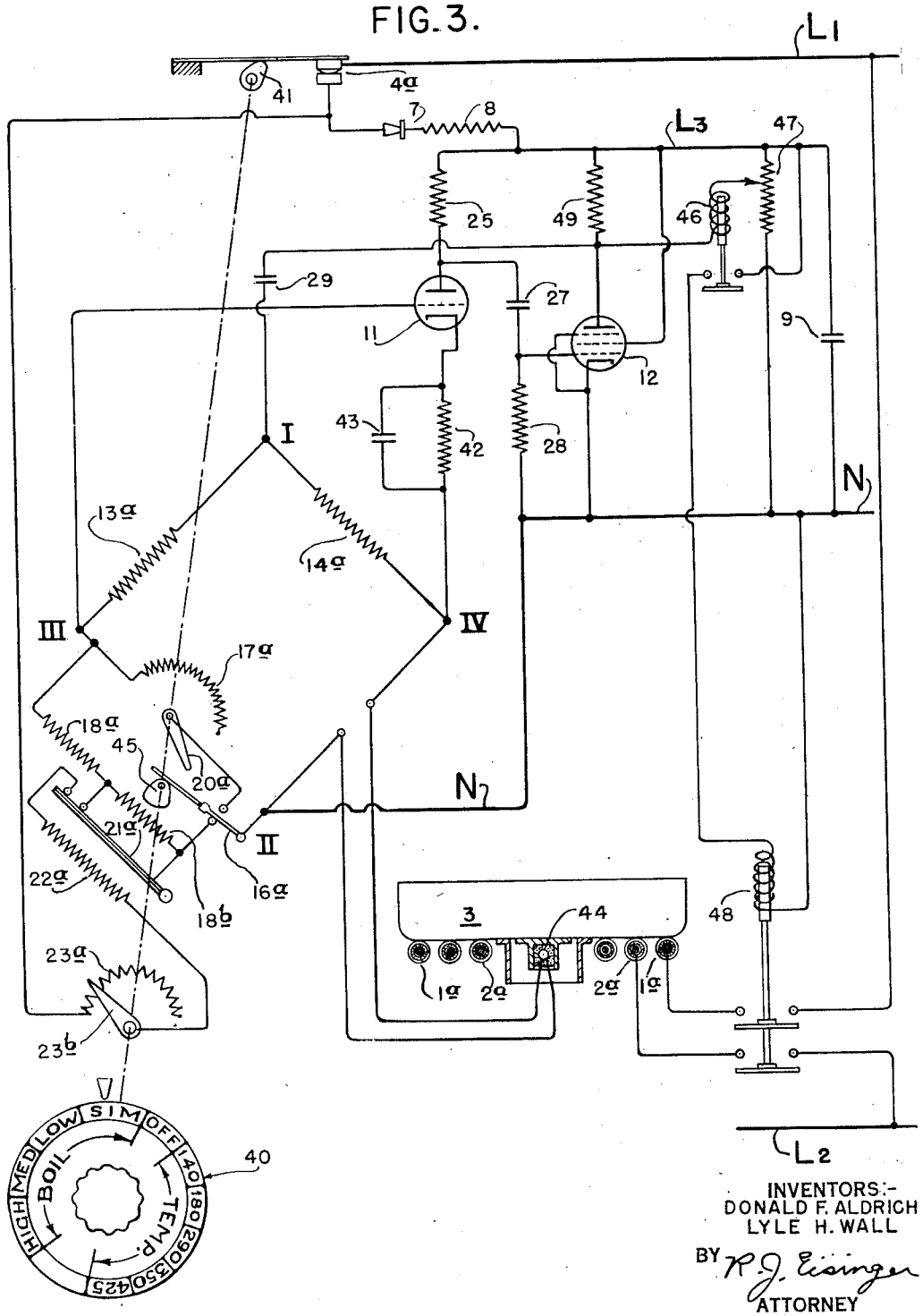
Fig. 3 is a schematic circuit diagram of another embodiment of a surface heating unit control and showing a manual control knob for adjusting all of the manually adjusted elements of the control.

While our invention is well adapted for use in electric cooking ranges, it is not so limited, but may be applied in other instances involving change of phase occurring at a nearly constant temperature in the heated substance.

In the first embodiment, shown in Figs. 1 and 2, the heater to be controlled comprises sections 1 and 2, which may be tubular sheathed elements arranged in a horizontal plane, as shown in Fig. 2, to provide a horizontal surface heating unit on which a utensil or vessel 3 may be placed. The heater sections 1 and 2 are of equal resistance and are connected in series to supply conductors $L_1$ and $L_2$ through line contacts 4 and 5 and a switch or relay 6 actuated by the novel control to be described. The conductors $L_1$ and $L_2$ are part of a 3-wire alternating circuit supply providing 220 volts between conductors $L_1$ and $L_2$ and 110 volts between each of these conductors and the grounded neutral N.

The control for the heater is supplied with direct current by the neutral N and a conductor $L_3$, the latter being connected to the conductor $L_1$ through a rectifier filter network composed of a rectifier 7, a resistor 8 and a capacitor 9. Conductor $L_3$ is maintained at a positive potential with respect to the neutral N when the main line switch contacts are closed. The capacitor 9 tends to minimize, but does not entirely eliminate, pulsations in the positive potential of the conductor $L_3$.

Considering the control first generally, it includes a Wheatstone bridge having diagonally opposite input corners I and II and output corners III and IV. A temperature variable impedance, in this case a capacitor 10, is connected in one bridge arm. The Wheatstone bridge controls an oscillator circuit network, including a triode 11 and a pentode 12, which in turn controls the relay 6. Considered generally, when the temperature responsive capacitor 10 is below the control temperature, oscillation does not take place and the circuit to the heater 1, 2 is closed. When the temperature of the capacitor 10 exceeds the control temperature, oscillation does take place and the circuit to the heater is opened.

Considering the control circuit now in detail, the arms I—III and I—IV of the bridge contain a fixed capacitor 13 and a fixed resistor 14, respectively.

The temperature variable capacitor 10 is connected in the arm II—III of the bridge and has a positive temperature coefficient of impedance. Structurally it is arranged centrally of the heating unit in contact with the bottom of the vessel as shown in Fig. 2, so that its temperature closely follows that of the bottom of the utensil.

Adjustable resistances are connectible into one arm of the bridge for the purpose of adjusting the bridge to determine the temperature of the temperature variable capacitor 10 at which the circuit through the heater 1, 2 is controlled, that is, the temperature above which the heater is deenergized and below which it is energized, and which is herein referred to as the control temperature. In the first embodiment, the adjustable resistances are connectible into the arm II—IV in balancing or opposed relation to the capacitor 10.

A resistor 15 is connected to the corner IV and a switch 16 is connected to the corner II, which is connected to the neutral N. Resistors 17, 18 and 19 are adapted to be selectively connected between the resistor 15 and the switch 16 as follows. When it is desired to effect a cooking operation in which the supply of heat is controlled to maintain a constant temperature of the utensil, the switch 16 is positioned to connect the resistor 17 in circuit. The resistor 17 has a slider 20 whereby its impedance may be varied to adjust the control temperature. When it is desired to effect a boiling operation, the switch 16 is positioned to connect the resistors 18 and 19 in the arm of the bridge. The resistor 19 is adapted to be connected intermittently or cyclicly in shunt with the resistor 18 by a cycling switch. When the cycling switch contacts are open, the resistor 18 provides a control temperature just above the boiling point, for example, 218° F. When the contacts are closed, the resistance offered by the resistors 18 and 19 is reduced to provide a control temperature just below the boiling point, for example, 204° F. Thus, the control temperature remains constant during a boiling operation at either 204° F. or 218° F. as determined by the cycling switch.

Any suitable type of cycling switch may be used to intermittently or cyclicly connect the resistor 19 in parallel with the resistor 18. In the first embodiment, in Fig. 1, the cycling switch comprises a bimetal element 21 which actuates one of the contacts and which is subjected to the heat of a small resistance heating element 22. The latter is connected through an adjustable resistor 23 to the junction 24 between the heater sections 1 and 2. When the relay 6 closes the circuit through the heater sections 1 and 2, the potential at the junction 24 is substantially the same as that in the neutral N, since the sections 1 and 2 are of equal resistance, so that the heating element 22 is deenergized. However, when the relay 6 opens its contacts, the heating element 22 is energized by current flowing from the neutral N through the relatively high impedance heating element 22, the adjustable resistor 23 and the low resistance heater section to the conductor $L_2$.

The oscillatory circuit used in each of the embodiments of my invention shown and described herein is of the relaxation type. The circuit shown in Fig. 1 comprises the triode 11 having its cathode and grid connected to the bridge output corners IV and III, respectively. Its plate is connected through a resistor 25 to the direct current supply conductor $L_3$. The pentode 12 has its cathode connected to the neutral N and its plate connected to the conductor $L_3$ through a heating element 26 of the relay 6.

The two tubes in this oscillator circuit are coupled to operate as a two-stage resistance capacitance coupled amplifier with the output of the second stage coupled to the input of the first stage. The control grid of pentode 12 is coupled to the plate of triode 11 by a resistance-capacitance coupling comprising a capacitor 27 connecting said grid and the plate of the triode 11 and a resistor 28 connected between the grid and the cathode of pentode 12. The plate of the pentode 12 is coupled to the grid of triode 11 by a resistance-capacitance feedback channel or coupling comprising a capacitor 29 connected between the plate and the bridge corner I, the Wheatstone bridge, and a resistor 30 connecting the grid and the cathode of triode 11.

The relay 6 comprises a movable contact supported by a bimetal, which is adapted to be heated by the heating element 26 and to deflect in contact closing direction upon increase in temperature. The average plate current through pentode 12 and heater 26 is higher when the circuit is not oscillating and at such time the bimetal is heated sufficiently to close the contacts of relay 6. When the circuit is oscillating, the heat dissipated by heater 26 is insufficient to cause the bimetal to close the relay contacts because the average plate current in pentode 12 is reduced.

*Figs. 1 and 2—operation*

To begin a cooking operation maintained at a given temperature, which may be either above or below the boiling point, the line contacts 4 and 5 are closed, the switch 16 is positioned to connect the resistor 17 in circuit, and the slider 20 is positioned in accordance with the desired control temperature. Assuming the utensil or vessel 3 to be at room temperature, the temperature variable capacitor 10 is at a low temperature and provides little impedance. This produces an output signal at the corners III and IV that calls for closing the circuit to the heater 1, 2, in this case a signal preventing oscillation in the oscillating circuit. The tubes 11 and 12 conduct continuously, so that the plate current of the pentode 12 flows continuously. The heat output of the heater 26 is high so that the bimetal moves to close the contacts of the relay 6 to close the circuit to the heater.

The circuit remains closed continuously to provide high heat to the vessel to heat it to the desired cooking temperature as rapidly as possible. As the temperature of the capacitor 10 increases, its impedance also increases, and as the temperature reaches the control temperature, the impedance reaches the critical value at which the signal output across the corners III and IV is changed to call for opening the heater circuit. In the present embodiment, this signal results in oscillation in the oscillator circuit. During oscillation, plate current from the pentode 12 flows intermittently through the heater 26, so that its heat output is reduced. The bimetal of the relay 6 responds to the reduced heat output to open the contacts controlling the heater 1, 2. The supply of current to the heater is cut off.

After a time, the vessel and the capacitor 10 cool to below the control temperature, whereupon the impedance of the capacitor 10 decreases below the critical value and changes the output signal across the corners III and IV to call for closing the heater circuit. In the present embodiment, this signal causes oscillation to cease. Thus, the supply of heat to the vessel is controlled to maintain the same substantially at the desired or control temperature by shutting off the heat supply as the temperature exceeds the control temperature and restoring the supply as the temperature drops below such value.

To adjust the control to a higher control temperature, the slider 20 is moved in the direction to impose greater resistance in the arm II—IV. This means that the capacitor 10 must attain a higher temperature, providing a higher impedance to match or balance the higher resistance in the arm II—III, in order to cause the heater to be deenergized. To adjust the control for a lower control temperature setting, the slider 20 is moved in the direction to decrease the resistance in the arm II—IV.

When it is desired to effect a cooking operation at boiling temperature, the line contacts 4 and 5 are closed, the switch 16 is positioned to connect the resistors 18 and 19 in circuit, and the resistor 23 is preset to the desired rate of boil. The bimetal 21 of the cycling switch being unheated, its contact is in closed position to connect the resistor 19 in circuit, so that the control is set or adjusted to the control temperature of 204° F. Assuming the vessel to be at room temperature, the impedance of the temperature variable capacitor 10 is low, so that the control operates in the manner previously described to close the heater circuit. Thus, continuous or high heat is supplied to the vessel to bring it up to the boiling temperature as quickly as possible.

As the temperature exceeds 204° F., the control opens the heater circuit. Intermittent supply of electric current to the heater 1, 2 now begins, so that the rate of heat delivered to the vessel is reduced to provide the desired rate of boiling, as determined by the adjustment of the resistor 23.

The operation of the cycling switch in this embodiment is as follows: As the relay 6 opens, the heater 22 of the cycling switch is energized. Its heat increases the temperature of the bimetal. The time required for heating the bimetal to the point at which it opens its contacts, determined by the setting of the resistor 23, determines the "off" period of the cycling of the heater circuit. As the contacts open, the resistor 19 is disconnected, so that the resistor 18 alone fixes the control temperature at 218° F. Since the capacitor 10 is below this control temperature, the control closes the heater circuit. The heating element 22 of the cycling switch is now deenergized, since the junction 24 and the neutral N are now at substantially the same potential. The bimetal 21 cools and moves in closing direction, and the time required for it to move to closed position measures the "on" period of the cycling of the heater circuit. As the resistor 19 is reconnected in circuit, the control temperature is shifted back to 204° F. and the capacitor 10 being above this temperature, the control opens the circuit to the heater. This cycle of opening and closing the circuit continues indefinitely as long as the control is not adjusted differently and the temperature of the capacitor 10 remains substantially at the boiling temperature.

To increase the rate or degree of boiling, the resistor 23 is adjusted for less resistance to provide greater current flow through the heating element 19. This reduces the period of time required for the bimetal 20 to be heated to open its contacts, which period of time determines the "off" period, so that the ratio of the "on" period to the "off" period is increased. To reduce the rate of boil, the resistor 23 is adjusted to interpose greater resistance to elongate the "off" period.

However, should the contents of the vessel be completely evaporated, the temperature of the vessel and the capacitor 10 will begin to rise. As the temperature exceeds 218° F., the control will operate to open the heater circuit, as the temperature is above both control temperatures. Accordingly, the heater circuit will be kept open as long as the temperature is above 218° F. In the first embodiment of Figs. 1 and 2, the cycling switch will stop cycling and will maintain the control temperature continuously at 218° F., due to the fact that opening of the heater circuit effects continuous energization of the heater element 22, maintaining the cycling switch contacts open. However, as soon as the temperature drops below the control temperature of 218° F., the heater circuit will be reclosed and cycling will take place until the temperature again exceeds 218° F.

Should the temperature of the capacitor 10 drop below 204° F., which would occur, for example, if the vessel on the heater 1, 2 were replaced by a cold vessel, the control would function to close the heater circuit continuously. Continuous energization deenergizes the heater 22 of the cycling relay, thereby maintaining the control temperature continuously at 204° F. until the temperature of the capacitor 10 exceeds that value, at which time cycling begins as heretofore described.

The resistance-capacitance coupled amplifier comprising tubes 11 and 12 will oscillate when the ratio of the impedance in the arm II—III to the impedance in arm I—III is above a critical value, which value is substantially the ratio of impedance in arm II—IV to the impedance in arm I—IV. It will be apparent that under such conditions, the potential at the corner III will be closer to the potential at corner I than the potential of corner IV will be, so that when corner I becomes negative with respect to corner II, corner III will be more negative than corner IV. Under such conditions, oscillation will take place. If the impedance of the capacitor 10 is reduced so that the ratio is below the critical value, then the potential at corner III is not closer to the potential at corner I than is corner IV and oscillation cannot take place.

Since oscillation is well understood in the art, it will be considered only briefly. An increase in current flow through the triode 11 caused by increase in potential of the grid, results in reduction in potential at the plate since the voltage drop across the resistor 25 is proportional to the current passing therethrough. Such reduction in plate potential causes, through the capacitor 27, a reduction in potential on the grid of the pentode 12, resulting in reduced flow of current therethrough, and as the voltage drop across heater 26 is also proportional to the current passing therethrough, the plate voltage is increased. This results, through the capacitor 29, in an increase in voltage at the corner I and a corresponding increase in voltage on the grid of triode 11, resulting in a further increase in current flow. These changes continue rapidly until current flow in triode 11 reaches maximum, current flow in pentode 12 is cut off, and the voltage on the grid of pentode 12 has been reduced until it is negative with respect to the cathode. This negative grid potential leaks off through the resistor 28, after which current flow through the pentode 12 begins. As this current flow increases, the plate voltage decreases, resulting, through the capacitor 29, in a reduction in potential at the corner I and a consequent reduction in potential at the grid of the triode 11 to reduce the current flow therethrough. The resulting increase in plate voltage of the triode 11 causes, through the capacitor 27, in an increase in grid potential of the pentode 12, resulting in further increase in current flow. These changes continue rapidly until current flow through the pentode 12 reaches a maximum, current flow through the triode 11 is cut off, and the potential at corner I is negative with respect to corner II and the potential at corner III is negative with respect to corner IV. The negative potential of the corner III and the gride of triode 11 leaks off through the resistor 30, after which current in triode 8 begins to flow and increases. This starts another cycle of oscillation as just described.

It will be apparent that, in the operation just mentioned, it is essential that the impedance of capacitor 10 be above the critical point and that the potential at corner III be closer to corner I than is corner IV so that when corner I becomes negative, corner III will be more negative than corner IV to cut off current through triode 11. When the temperature and impedance of the capacitor 10 are reduced so that the potential at corner III is no longer closer to corner I than is corner IV, then plate current in triode 11 cannot be cut off, so that oscillation ceases and both tubes conduct continuously.

*Fig. 3*

Fig. 3 shows a second embodiment of our invention which is generally quite similar to the first embodiment. Identical parts are identified by the same reference numerals and corresponding or equivalent parts are designated by the same reference numerals with the suffix "a" attached.

The principal modification of this embodiment is that it incorporates a manually actuated rotatable knob 40 for actuating all of the manually adjusted control elements, which are preferably connected thereto in fixed relation for rotation about a common axis depicted by the dot and dash line.

The knob has an "off" indicia designating its off position and has two different portions of its range of adjustments to provide either boiling control or temperature regulation for non-boiling operations, respectively. To the left of the "off" indicia (brought into effect by clockwise movement of the knob) are a plurality of indicia designating successively higher or greater rates of boil. To the right of the "off" indicia (brought into effect by counterclockwise movement of the knob) are a plurality of indicia designating successively higher temperature settings. The range of temperature settings preferably extends both below and above the boiling point of water, for example, through a range from 140° F. to 425° F. It is to be understood that any other suitable indicia may be used to designate the several positions.

The line switch 4a is opened by a cam 41 when the knob 40 is turned to the "off" position and disconnects the entire control network from the supply conductor $L_1$. In all other positions, the switch 4a is closed.

The Wheatstone bridge shown in Fig. 3 has input corners I and II and output corners III and IV corresponding to the identically marked corners of the bridge in the first embodiment, with corners I, II and III connected externally of the bridge in the same manner as in Fig. 1. Corner IV, however, is connected to the cathode of triode 11 through a resistance 42 and a capacitor 43 connected in parallel.

In this embodiment, the temperature-responsive impedance element comprises a resistor 44 having a negative temperature coefficient of resistance, commonly referred to as a thermistor. In order for the Wheatstone bridge to control the oscillator in the same manner as explained for the first embodiment, the thermistor is connected in the arm II—IV of the bridge. Fixed resistors 13a and 14a are connected, respectively, in the arms I—III and I—IV.

The resistors to provide temperature adjustment are connected in the arm II—III in opposed relation to the thermistor in the arm II—IV. The selector switch 16a connected to the corner II is actuated by a cam 45 rotatable with the knob 40. As the knob 40 is turned counterclockwise from the "off" position to a position for operation under temperature control, the cam 45 positions the switch 16a to connect a variable resistor 17a and its slider 20a in the arm II—III, and it also moves the slider into engagement with the resistor 17a.

As the knob is rotated clockwise from the "off" position to a position for a boiling operation, the cam 45 positions the switch 16a to connect resistors 18a and 18b in the arm II—III, and the slider 23b moves into engagement with the resistor 23a. The resistors 18a and 18b are connected in series and together provide a temperature setting of 204°. However, the resistor 18b is adapted to be cyclically shunted, at which time the lower resistance of the resistor 18a alone provides a temperature setting of 218°, by the bimetal arm 21a of a cycling switch that also includes a resistor 22a. The bimetal 21a is connected at its fixed end to one terminal of the resistor 18b, and its movable end is adapted to engage simultaneously one contact connected to the junction between the resistors 18a and 18b and another contact connected to one terminal of the heating element 22a.

The current flowing through the heating element is adjustable by the variable resistor 23a whose slider 23b is actuated by the knob 40. The slider 23b is connected to the other terminal of the heating element 22a and the resistor itself is connected between the line switch 4a and the rectifier 7. Thus, 110 volt A. C. current flows from conductor $L_1$ through line switch 4a, resistor 23a, slider 23b, heating element 22a, bimetal 21a and the switch 16a to the neutral N for energizing the heating element 22a.

Since all four arms of the bridge comprise resistive elements, the bridge itself and the resistor 42 permit the negative voltage which occurs on the grid of triode 8 during each cycle of oscillation to leak off to reduce the potential on the grid to reestablish conduction therein. In the first embodiment, such negative voltage leaks off through the resistor 30.

In place of the thermal relay 6 of the first embodiment, the second embodiment includes a control relay 46, whose winding is connected between the plate of pentode 12 and supply conductor $L_3$ (optionally through an adjustable resistor 47 connected between conductors $L_3$ and N) and whose contacts control the winding of a secondary relay 48, the contacts of which are adapted to connect the main heater 1a directly across the supply conductors $L_1$ and $L_2$. These relays are arranged to be closed when energized and opened when deenergized. A resistor 49 may be connected between the plate of pentode 12 and conductor $L_3$.

*Fig. 3—operation*

The operation of the second embodiment shown in Fig. 3 is basically the same as that of the first embodiment, the principal difference being that, upon increase in temperature, the resistance in arm II—IV is decreased, whereas in the first embodiment the resistance in the arm II—III is increased. In both cases, however, the ratio of impedance in arm II—III to arm I—III is increased in relation to the ratio of impedance in arm II—IV to the impedance in arm I—IV, so that the effect on the signal output across the corners III and IV is the same. Conversely, upon decrease in temperature and increase in resistance in arm II—IV, the ratio of impedance in arm II—III to impedance in arm I—III is decreased in relation to the ratio of impedance in arm II—IV to the impedance in arm I—IV. The operation of the oscillating circuit under control of the signal output from the corners III and IV may be exactly the same. In this case, when the circuit does not oscillate, the plate current through the winding of the relay 46 is sufficient to close the contacts, so that the secondary relay 48 closes its contacts to supply current to the main heater 1a. When the circuit does oscillate, the plate current flow through the winding of the relay 46 is not sufficient to close the contacts, and the relay 48 opens the circuit to the main heater 1a.

To raise the control temperature or setting, when using this embodiment for temperature controlled operation, the slider 20a is rotated counterclockwise by the knob 40 to reduce the resistance in the arm II—III. This reduces the corresponding resistance in the arm II—IV at which the control operates to open and close the heater circuit. To lower the control temperature the slider 20a is rotated clockwise.

Control for boiling operation is, in principle, the same as before. When the bimetal 21a is at a low temperature, it closes its contacts, as shown in Fig. 3. The reduced resistance offered by the resistor 18a alone provides the higher control temperature of 218°, so that if the vessel 3 is at the boiling temperature, the heater 1a is energized to provide the "on" period of the cycling of the main heater to provide wattage control for boiling. At the same time, the circuit through the heating element 22a is closed, so that it is supplying heat to the bimetal 21a to deflect it in opening direction. The time required for the bimetal to be heated sufficiently to open its contacts measures the "on" period.

As the bimetal 21a opens its contacts, the resistor 18b is again in circuit to effect the control temperature at 204°, which provides the "off" period of the cycling of the main heater 1a. The time required for the bimetal 21a to cool sufficiently to reclose its contacts measures the "off" period of the cycle.

The cycling switch of this embodiment effects cycling operation at all times that it is connected in circuit by the selector switch 16a, even though the temperature of the vessel be below 204° or above 218°. The effect, however, is exactly the same as in the first embodiment. Below 204°, the heater is energized continuously because the temperature is below both control temperatures. Above 218°, it is continuously deenergized as the temperature is above both control temperatures, and at the boiling temperature, cycling takes place as in the first embodiment.

To increase the rate of boil, the knob 40 is moved clockwise to place a greater portion of the resistor 23a in circuit and reduce the heating effect of the heating element 22a. Thus, a longer time is required to deflect the bimetal 21 to open its contacts, thereby increasing the "on" period and the average wattage output of the main heater 1a. To decrease the rate of boil, the knob is turned counterclockwise to heat the bimetal more rapidly and decrease the "on" period and the average wattage output of the main heater 1a.

While both embodiments incorporate an oscillating circuit with an amplifier, it is to be understood that other types of amplifier circuits may be used. For example, the amplifier circuit disclosed in the invention application of Booker and Nagel may be substituted.

While the invention has been shown in several forms, it will be obvious to those skilled in the art that it is not so limited, but is susceptible of various other changes and modifications without departing from the spirit thereof.

In each embodiment, the length of each cycle of the cycling switch is preferably not more than 30 seconds. It may well be, for example, 20 seconds.

What is claimed is:

1. In a heating device, a heater, means to control the operation thereof comprising a switching means governing current flow to said heater, a network comprising a channel embodying a temperature-variable impedance for opening and closing said switching means, and means for cycling between two fixed values the temperature of said impedance at which said switching means is moved from closed to open position, one of said fixed values being slightly below and the other slightly above the boiling point of water, said temperature remaining constant at one or the other of said two values, and the length of the cycle effected by said cycling means being not greater than approximately 30 seconds.

2. In a heating device, a heater, means to control the operation thereof comprising a switching means governing current flow to said heater, a network comprising a first channel embodying a temperature-variable impedance, a second channel balanced against said first channel to control said switching means and comprising two parallel branches respectively comprising a variable impedance and a second impedance, a double-throw switch for selectively connecting said variable impedance or said second impedance in said second channel, and a cycling switch for periodically shifting said second impedance to keep it alternately at one and then the other of two fixed values, the length of the cycle effected by said cycling switch being not greater than approximately 30 seconds.

3. Control means for an electric heater comprising an electrical circuit element having a control electrode, said element acting to cut off power to said heater when a predetermined potential is applied to its control electrode, a bridge circuit provided with a voltage supply and comprising a first bridge-arm which embodies a first impedance, a second bridge-arm which embodies a thermally-responsive impedance, a third bridge arm comprising a third impedance and a fourth bridge arm comprising a double throw switching means which in its first position connects a manually variable impedance in said fourth bridge arm and in its second position connects in said fourth bridge arm a fifth impedance which is periodically shunted by a sixth impedance in series with a cycling switch, the length of the cycle effected by said cycling switch being not greater than approximately 30 seconds, the voltage supply being connected between said diagonally opposite corners of said bridge, and means to vary the potential of said control electrode in response to the potential difference between the other two corners of said bridge.

4. Control means for an electric heater comprising an electrical circuit element having a control electrode, said element acting to cut off power to said heater when a predetermined potential is applied to its control electrode, a bridge circuit provided with a voltage supply and comprising a first bridge-arm which embodies a first impedance, a second bridge-arm which embodies a thermally-responsive impedance, a third bridge arm comprising a third impedance and a fourth bridge arm comprising a double throw switching means which in its first position connects a manually variable impedance in said fourth bridge arm and in its second position connects in said fourth bridge arm a fifth impedance which is shunted by a sixth impedance in series with a cycling switch, the length of the cycle effected by said cycling switch being not greater than approximately 30 seconds, the voltage supply being connected between diagonally opposite corner of said bridge, an oscillation generator, means to connect the two other corners of said bridge in a feedback channel of said generator, and means for coupling the output circuit of said generator to said control electrode.

5. In a heating device, a heater, means for sensing a temperature which is to be controlled, means connected to said sensing means for connecting said heater to a source of energy when the temperature sensed by said means is below a predetermined control temperature and for disconnecting said heater when the temperature sensed by said means is above said predetermined control temperature, a manually actuated control member, means for adjusting the control temperature at which said temperature-responsive means disconnects said heater to only one value for each position of said control member over one portion of its range of adjustment, and means for cycling the control temperature at which said temperature-responsive means disconnects said heater to one and then to the other of two different fixed values, said control temperature remaining constant at one or the other of said two values, when said control member is positioned in another portion of its range of adjustment, said cycling means providing periods of energization and deenergization of said heater corresponding to periods in which said two control temperature values are in effect, respectively, provided that the temperature of said sensing means is between said two values, said periods being independent of changes in the temperature of said sensing means between said two values and being sufficiently short that the heating result is approximately the same as if said heater had been energized continuously at a mean level of energization required to maintain a desired heat output.

6. In a heating device, a heater, means for sensing a temperature which is to be controlled, means connected to said sensing means for connecting said heater to a source of energy when the temperature sensed by said means is below a predetermined control temperature and for disconnecting said heater when the temperature sensed by said means is above said predetermined control temperature, a manually actuated control member, means for adjusting the control temperature at which said temperature-responsive means disconnects said heater to only one value for each position of said control member over one portion of its range of adjustment, means for cycling the control temperature at which said temperature-responsive means disconnects said heater between two different fixed values when said control member is positioned in another portion of its range of adjustment, and means for varying the relative length of time of each cycle of said cycling means during which the temperature-responsive means responds at one of the two fixed control temperatures.

7. In a heating device, a heater, means for connecting said heater to a source of energy, temperature-responsive means for controlling said means, a manually actuated control member, means for adjusting the temperature at which said temperature-responsive means disconnects said heater to a different value for each position of said control member over one portion of its range of adjustment, means for cycling the temperature at which said temperature-responsive means disconnects said heater between two different fixed values when said control member is positioned in another portion of its range of adjustment, and means for varying the relative length of time of each cycle of said cycling means during which the temperature-responsive means responds at one of the two fixed values, upon movement of said control member within said other portion of its range of adjustment.

8. In a heating device, a heater, means for connecting said heater to a source of energy, a manually actuated control member, temperature-responsive means for controlling said means, means for adjusting the control temperature at which said temperature-responsive means disconnects said heater to a different value for each position of said control member over one portion of its range of adjustment, and means for cycling the temperature at which said temperature-responsive means disconnects said heater alternately to a temperature just below the boiling point of water and then to a temperature just above said boiling point, said control temperature remaining constant at one or the other of said two values, when said control member is positioned in another portion of its range of adjustment, said cycling means providing periods of energization and deenergization of said heater corresponding to periods in which said two control temperature values are in effect, respectively, provided that the temperature of said temperature-responsive means is between said values, said periods being independent of changes in the temperature of said temperature-responsive means between said two values and being sufficiently short that the heating result for a boiling operation is substantially the same as if said heater had been energized continuously at a mean level of energization required to maintain a desired boiling rate.

9. The combination with a switch, of control mechanism, comprising a temperature responsive element, for opening said switch when the temperature of said element exceeds a predetermined or control temperature and for closing said switch when the temperature of said element decreases below said predetermined or control temperature, means for cyclically varying the control temperature between a value just below and a value just above the boiling point of water, and manually adjusted means for varying the ratio of the period of time that the control is set for one of said temperature values in relation to the period of time that the control is set for the other of said temperature values, said control temperature remaining constant during each of said periods of time, said cycling means providing open and closed periods of said switch corresponding to periods in which said two control temperature values are in effect, respectively, provided that the temperature of said temperature-responsive element is between said values, the duration of said open and closed periods being independent of changes in the temperature of said element between said values and being sufficiently short that the heat output of a heater when energized at a high energy level under control of said switch is approximately the same as if said heater had been energized continuously at a lower level of energization required to provide a desired heat output.

10. The combination with a switch, of control mechanism, comprising a temperature-responsive element, for opening said switch when the temperature of said element exceeds a predetermined or control temperature and for closing said switch when the temperature of said element decreases below said predetermined or control temperature, means for cyclically varying the control temperature between a value just below and a value just above the boiling point of water, manually adjusted means for varying the ratio of the period of time that the control is set for one of said temperature values in relation to the period of time that the control is set for the other of said temperature values, said control temperature remaining constant during each of said periods of time, said cycling means providing open and closed periods of said switch corresponding to periods in which said two control temperature values are in effect, respectively, provided that the temperature of said temperature-responsive element is between said values, the duration of said open and closed periods being independent of changes in the temperature of said element between said values and being sufficiently short that the heat output of a heater when energized at a high energy level under control of said switch is approximately the same as if said heater had been energized continuously at a lower level of energization required to provide a desired heat output, and manually actuated means having a range of adjustment for adjusting the control mechanism to gradually vary said control temperature, said control temperature remaining constant for each position of said manually actuated means within said range.

11. The combination with a switch, of a control mechanism, comprising a temperature responsive element, for opening said switch when the temperature of said element exceeds a predetermined or control temperature and for closing the switch when the temperature is below said predetermined or control temperature, a manually actuated control member, means controlled by said manually actuated member for adjusting the control mechanism to vary said control temperature, said control temperature remaining constant at each position of said manually actuated member in one portion of its range of actuation, means controlled by said manually actuated member for varying the control temperature between a value just below and a value just above the boiling point of water, and means controlled by said manually actuated member in accordance with the position thereof for varying the ratio of the period of time that the control is adjusted to one of said two values to the time that it is adjusted to the other thereof, the control temperature remaining constant during each of said periods of time.

12. The combination with an energy controlling device, of a control mechanism, including a control network and a temperature variable impedance element in said control network, for actuating said energy controlling device to shut off the flow of energy upon increase in temperature of said element above a given or control temperature and to permit the flow of energy upon decrease in temperature below said given or control temperature, a manually actuated control member, a variable resistor actuated by said manually actuated control member upon movement throughout one range of positions thereof and connected in said control network to vary said control temperature, a second impedance element and a cycling switch, said second impedance element being cyclically connected into and out of the network by said cycling switch throughout a second range of positions of said manually actuated member, the control temperature being cycled alternately between two values, one just below and the other just above the boiling point of water, by the cycling connection of said second impedance element when the manually adjusted member is in said second range of positions, the ratio of the time that the control temperature is at one value to the time that it is at the other value being varied upon movement of said manually actuated member to different positions in said second range.

13. A control network comprising an impedance element having an impedance characteristic that is variable with the temperature of the element, a manually adjustable variable impedance element also connected in said network for adjusting the setting thereof, a third impedance element, means for cyclically connecting said third impedance element into and out of the control network, and manually adjusted means for initiating and terminating said cycling operation and for varying the ratio of time that said third impedance element is connected into the circuit to the period of time that it is connected out of the circuit, the length of the cycle of said cyclically connecting means being not greater than approximately 30 seconds, said network including means for connecting it to control means so that the latter will be responsive to the cycling means and to changes in impedance of said temperature-variable element and said manually adjustable impedance element.

14. A control for regulating the output of a heater, comprising a temperature responsive element for sensing the temperature of a load on said heater, means for controlling the energization of said heater, said means being connected to said element and responsive thereto to energize said heater at a first energy level when the temperature of said element is below a predetermined or control temperature and to reduce the heater energization to a second energy level when the temperature of said element exceeds said control temperature, means for cyclically shifting the control temperature alternately to one value for one period of time, and then to a second value for a second period of time, said cycling means being constructed and arranged so as to maintain the control temperature substantially constant throughout each of said periods to provide corresponding periods of energization of said heater at one or the other of said energy levels when the temperature of said element is in a range between said values, the duration of said periods of energization being independent of changes in the temperature of said element within said range and being sufficiently short that the heating of said load is sensibly the same as if said heater had been energized continuously at a constant energy level intermediate said first and second levels.

15. A control for regulating the output of a heater, comprising a temperature-responsive element for sensing the temperature of a load on said heater, means for controlling the energization of said heater, said means being connected to said element and responsive thereto to energize said heater at a first energy level when the temperature of said element is below a predetermined or control temperature and to reduce the heater energization to a second energy level when the temperature of said element exceeds said control temperature, means for cyclically shifting the control temperature alternately to one value for one period of time, and then to a second value for a second period of time, said cycling means being constructed and arranged so as to maintain the control temperature substantially constant throughout each of said periods to provide corresponding periods of energization of said heater at one or the other of said energy levels when the temperature of said element is in a range between said values, the duration of said periods of energization being independent of changes in the temperature of said element within said range and being sufficiently short that the heating of said load is sensibly the same as if said heater had been energized continuously at a constant energy level intermediate said first and second levels, and manually adjustable means for varying the ratio of the period of time that said control temperature is at said one value to the period of time that the control temperature is at the second value.

References Cited in the file of this patent
UNITED STATES PATENTS

| | | |
|---|---|---|
| 2,148,491 | Moore | Feb. 28, 1939 |
| 2,220,028 | Smith | Oct. 29, 1940 |
| 2,265,512 | Brown et al. | Dec. 9, 1941 |
| 2,298,847 | Smith | Oct. 13, 1942 |
| 2,376,488 | Jones | May 22, 1945 |
| 2,427,945 | Clark et al. | Sept. 23, 1947 |
| 2,490,965 | Huck | Dec. 13, 1949 |
| 2,500,061 | Clark | Mar. 7, 1950 |
| 2,510,041 | Rudahl | May 30, 1950 |

OTHER REFERENCES

Wilson: Electronics; vol. 23; No. 12, December 1950; pp. 84–87.